United States Patent Office 3,235,457
Patented Feb. 15, 1966

3,235,457
HUMECTANT
Karl Laden, Deerfield, Ill., assignor to The Gillette Company, Boston, Mass., a corporation of Delaware
No Drawing. Filed Dec. 7, 1962, Ser. No. 243,709
4 Claims. (Cl. 167—85)

This application is a continuation-in-part of Serial No. 158,898, filed December 12, 1961, now abandoned.

This invention relates to the reduction in moisture-loss tendency of articles of manufacture which tend to lose moisture upon exposure to the atmosphere and pertains more specifically to the use of hygroscopic salts of certain organic carboxylic acids as a humectant for a wide variety of compositions.

A great many compositions containing non-aqueous ingredients along with some water or moisture have a tendency to lose moisture when exposed to the atmosphere at ordinary room temperature and an even greater tendency to moisture loss at elevated temperatures. This loss in moisture content frequently has a deletrious effect upon the desired properties of the composition. Moreover, once the moisture has been lost, it is usually very difficult to restore it and to ensure that the original physical properties of the composition are regained.

It has been found that by incorporation in such compositions of at least 2% by weight of a hygroscopic salt of selected carboxylic acids based on the total weight of the composition, the tendency of the composition to lose moisture upon exposure to the atmosphere is markedly reduced. The carboxylic acids, the hygroscopic salts of which are employed in the present invention, are closely related to each other in chemical composition and consist of 2-pyrrolidone-5-carboxylic acid, 1-methyl-2-pyrrolidone-5-carboxylic acid, 2-pyrrolidone-4-methyl-5-carboxylic acid, N-acetyl glycine, α-acetamido butyric acid, and N-acetyl alanine. In the case of cosmetic compositions and ointments which during use come into contact with the skin, it is possible to incorporate the free carboxylic acids in the composition, the free acid re-acting with sodium ions naturally present on the skin or in perspiration to form the hygroscopic sodium salt having the desired humectant properties while in place on the skin. Except in the case of such cosmetics and ointments, or other compositions for use on a material which reacts with the acid to form a hygroscopic salt, it is normally desirable to incorporate the preformed hygroscopic salts of the acids in the composition.

Among the hygroscopic salts useful in the present invention are the sodium, potassium, and ammonium salts, as well as the lower alkanolamine salts, such as salts of mono-, di- and triethanolamine and mono-, di- and triisopropanolamine and mixtures thereof. All of the salts useful in the present invention are hygroscopic to the extent that the pure dry salts exhibit an increase of at least 30% by weight by absorption of moisture from the atmosphere when exposed at room temperature to air at 60% relative humidity for a sufficiently long time to permit equilibrium to be achieved. All of the salts are also water soluble. Furthermore, since the free acid is itself non-hygroscopic, it may readily be stored over long periods of time without any special precautions to keep it sealed from the atmosphere, and it may readily be converted into the desired hygroscopic salt immediately before use.

Although the hygroscopic salts of the present invention must be present in an amount which is at least 2% by weight of the total weight of the composition in order to be effective, there is no definite upper limit on the amount which may be present aside from that imposed by economic or esthetic considerations. Up to 20% by weight or even more may be present under some conditions, but usually best results are obtained when the humectant amounts to 4% to 10% by weight of the total weight of the composition.

The humectant materials of the present invention are useful in any product or composition which has a tendency to lose moisture upon exposure to the atmosphere including not only cosmetic compositions, especially those which are to be applied to the hair or skin, and ointments, but also such products or compositions as cellulosic materials including regenerated cellulose film, paper products, and tobacco; dentrifrice paste; and food products such as baked goods, fudge, chocolate candy, and the like. Among such cosmetic compositions are formulations such as hair sprays, hair groom preparations, talcs and body powders, cleansing creams, shaving creams, shaving powders and sticks of the type used to produce lather, preshave lotions, deodorants and antiperspirants, and so forth. In the case of food products, because of the salty taste of the salts, the maximum amount which may be used will vary depending upon the type of food; i.e., larger quantities may be used in foods which are normally salty in taste. Of the various salts which may be used in the invention, the sodium salt is preferred both because of its low cost and its known nontoxic properties.

The humectant materials of the present invention are of particular value in cosmetic compositions and formulations such as ointments which are to be applied to the skin. Such compositions, whether they contain the free acid or the preformed hygroscopic salt, have the effect when applied to the skin of reducing its tendency to dry out, causing the skin to maintain a soft, smooth feeling as well as reducing the tendency of the skin to crack, especially under conditions of very low humidity. The humectants may be employed with any cosmetic or ointment formulation whether aqueous or not, but are of particular value with oleaginous cosmetic and ointment formulations—i.e., those containing oils, greases or soft waxes—whether they be in the form of water-in-oil or oil-in-water emulsions and whether they be in the form of liquids, pastes, creams, or solid cakes.

The following specific examples are intended to illustrate more clearly the nature of the present invention, but are not intended as a limitation upon the claims.

*Example 1*

The following composition was prepared, in which the parts are by weight:

| | Parts |
|---|---|
| Oil phase: | |
|    Stearic acid | 18.00 |
|    Mineral oil | 5.00 |
|    Polyoxyethylene (20) propylene glycol monostearate | 5.00 |
|    Propyl ester of p-hydroxybenzoic acid | 0.05 |
| Water phase: | |
|    Propylene glycol | 5.00 |
|    Methyl ester of parahydroxybenzoic acid | 0.10 |
|    2-pyrrolidone-5-carboxylic acid | 5.00 |
|    Sodium hydroxide | 1.60 |
|    Water | 59.25 |
|    Triethanolamine | 1.00 |

The materials in the oil phase were mixed with rapid agitation while heating them to a temperature of approximately 75° C. The previously mixed water phase containing the sodium salt of 2-pyrrolidone-5-carboxylic acid was then added at about the same temperature while maintaining the agitation. After complete mixing, the emulsion was cooled to about 40° C., and agitation was then slowed until room temperature was reached. A smooth free-flowing lotion was obtained which was found to be very satisfactory as a skin lotion.

Equally satisfactory results were obtained by replacing the 2-pyrrolidone-5-carboxylic acid in the foregoing composition with an equimolar quantity of either 1-methyl-2-pyrrolidone-5-carboxylic acid or 2-pyrrolidone-4-methyl-5-carboxylic acid or N-acetyl glycine or N-acetyl alanine or α-acetamido butyric acid.

*Example 2*

The following composition was prepared, in which the parts are by weight:

| | Parts |
|---|---|
| Cetyl alcohol | 1.50 |
| Stearyl alcohol | 1.50 |
| Sodium lauryl sulfate | 0.25 |
| Polyethylene glycol laurate | 1.00 |
| Mineral oil | 5.00 |
| Lanolin | 1.00 |
| 2-pyrrolidone-5-carboxylic acid, sodium salt | 5.00 |
| Water to | 100.00 |

The sodium salt of 2-pyrrolidone-5-carboxylic acid was dissolved in a small part of the water, while the other ingredients were added to the remainder of the water and heated to 80° C. with continuous agitation. While the emulsion was cooling, the salt solution was incorporated and mixed continuously until room temperature was reached. The resulting product was a satisfactory cream for chapped skin.

The same results were obtained when there was employed, in place of the sodium salt of 2-pyrrolidone-5-carboxylic acid, an equal quantity by weight of either the sodium salt of 1-methyl-2-pyrrolidone-5-carboxylic acid, the sodium salt of 2-pyrrolidone-4-methyl-5-carboxylic acid, the sodium salt of N-acetyl glycine, the sodium salt of α-acetamido butyric acid, or the sodium salt of N-acetyl alanine.

*Example 3*

The following composition was prepared, in which the parts are by weight:

| | Parts |
|---|---|
| Beeswax | 74.3 |
| Olive oil | 2.6 |
| Lanolin | 19.9 |
| Isopropyl myristate | 1.2 |
| Sodium salt of 2-pyrrolidone-5-carboxylic acid | 2.0 |

All of the ingredients were melted together, and after thorough stirring the mixture was poured into molds to form cosmetic sticks useful for preventing chapped lips.

*Example 4*

The following composition was prepared, in which the parts are by weight:

| | Parts |
|---|---|
| Glyceryl monostearate | 2.0 |
| Stearic acid | 7.0 |
| Oleic acid | 3.0 |
| Cetyl alcohol | 2.0 |
| 2-pyrrolidone-5-carboxylic acid | 2.0 |
| Triethanolamine | 0.9 |
| Menthyl anthranilate | 4.0 |
| Water | 78.7 |
| Perfume | 0.4 |

The triethanolamine and 2-pyrrolidone-5-carboxylic acid were dissolved in the water at a temperature of about 80° C. to form a solution of the corresponding triethanolamine hygroscopic salt. The remaining ingredients except for the perfume were melted and stirred together at about the same temperature, after which the aqueous solution and the melt were mixed and stirred thoroughly while cooling. When cooled the perfume was added. The result was an emulsified lotion useful as a suntan aid.

Equally satisfactory results were obtained using an equal weight of the ammonium salt of N-acetyl glycine instead of the ammonium salt of 2-pyrrolidone-5-carboxylic acid in the foregoing composition.

*Example 5*

The following composition was prepared, in which the parts are by weight:

| | Parts |
|---|---|
| Glyceryl monostearate | 6.0 |
| Potassium salt of 2-pyrrolidone-5-carboxylic acid | 5.0 |
| Mineral oil | 2.0 |
| Hexachlorophene | 0.2 |
| Water | 86.2 |

All of the ingredients were heated together to a temperature of 95°–100° C. with continuous agitation to form an antiseptic baby lotion for application to the skin.

When an equal weight of the potassium salt of N-acetyl alanine was used in the foregoing composition in place of the potassium salt of 2-pyrrolidone-5-carboxylic acid, essentially the same results were obtained.

*Example 6*

The following composition was prepared, in which the parts are by weight:

| | Parts |
|---|---|
| Glycerine | 5.0 |
| Alcohol | 2.0 |
| 2-pyrrolidone-5-carboxylic acid | 2.0 |
| Water | 66.3 |
| Talc | 10.0 |
| Zinc oxide | 2.0 |
| Magnesium carbonate | 4.0 |
| Iron oxide pigments | 6.0 |
| Preservative | 0.2 |
| Perfume | 0.5 |
| Sea Kem Type 4 (a natural gum) | 2.0 |

All of the solid materials in powdered form were mixed together to form a homogeneous mass. The glycerine and 2-pyrrolidone-5-carboxylic acid were dissolved in the water and heated to about 90° C. The Sea Kem was mixed with the alcohol and poured into the hot water, which was then stirred to dissolve the gum completely and allowed to cool, after which the mixture of solid materials was dispersed in the liquid. The result was a satisfactory liquid make-up.

*Example 7*

The following composition was prepared, in which the parts are by weight:

| | Parts |
|---|---|
| Alcohol | 45.0 |
| 2-pyrrolidone-5-carboxylic acid | 3.0 |
| Menthol | 0.2 |
| Perfume | 0.5 |
| Water | 51.3 |

The menthol and perfume were dissolved in the alcohol and the 2-pyrrolidone-5-carboxylic acid was dissolved in the water. The two solutions were then mixed and were found to provide a satisfactory after-shave lotion. While the alcohol used is preferably ethyl alcohol, isopropyl alcohol may also be used.

Equally satisfactory results were provided by replacing the 2-pyrrolidone-5-carboxylic acid in the foregoing composition with an equal weight of either 1-methyl-2-pyrrolidone-5-carboxylic acid or 2-pyrrolidone-4-methyl-5-carboxylic acid or N-acetyl glycine or N-acetyl alanine or α-acetamido butyric acid.

Example 8

The following composition was prepared, in which the parts are by weight:

| | Parts |
|---|---|
| Spermaceti | 15.0 |
| Polyoxyethylene sorbitan monostearate | 18.0 |
| Water | 65.0 |
| 2-pyrrolidone-5-carboxylic acid | 2.0 |
| Preservative | Q.s. |

The spermaceti and polyoxyethylene sorbitan monostearate were melted at about 80° C. The 2-pyrrolidone-5-carboxylic acid was dissolved in the water at about the same temperature, and the two liquids were then mixed thoroughly and allowed to cool to provide an ointment base.

Example 9

Different samples of the same unplasticized regenerated cellulose film were immersed in separate 10% aqueous solutions of the sodium salt of 2-pyrrolidone-5-carboxylic acid and of glycerol for 24 hours each and allowed to dry at room temperature. When compared to an untreated sample, both treated samples were found to be soft and considerably less "noisy" when flexed.

Example 10

Two edible cakes were prepared, both having the following recipe, but one containing in addition 5% by weight of the sodium salt of 2-pyrrolidone-5-carboxylic acid:

| | |
|---|---|
| Butter | ½ cup. |
| Sugar | 1 cup. |
| Eggs | 2 medium. |
| Flour | 1½ cups. |
| Milk | ½ cup. |
| Baking powder | 1 tablespoon. |
| Vanilla | ½ tablespoon. |

The cakes were baked under identical conditions and allowed to stand exposed to the atmosphere side by side for a period of nine days, during which time the moisture loss was determined at intervals, with the following results:

| | Percent Moisture Loss | | Percent Retardation |
|---|---|---|---|
| | PCA[1] Cake | Control Cake | |
| 1 day | 8.2 | 10.5 | 21.9 |
| 3 days | 18.2 | 21.4 | 15.0 |
| 9 days | 24.1 | 28.9 | 16.6 |

[1] Sodium salt of 2-pyrrolidone-5-carboxylic acid.

After nine days' exposure, the cake containing the sodium salt of 2-pyrrolidone-5-carboxylic acid maintained a smooth and attractive surface texture while the other cake had several deep fissures radiating from its center.

Example 11

Two batches of chocolate fudge were prepared, both having the following recipe, except that to one of the recipes there was added 5% by weight of the sodium salt of 2-pyrrolidone-5-carboxylic acid.

| | |
|---|---|
| Bitter chocolate | 2 oz. |
| Granulated sugar | 2 cups. |
| Milk | ¾ cup. |
| Corn syrup | 5 tablespoons. |
| Salt | ⅛ teaspoon. |

The two batches of fudge were cooked in the same manner and after cooling were allowed to remain exposed to the atmosphere side by side for a total of nine days, during which period the moisture loss was measured, with the following results:

| | Percent Moisture Loss | | Percent Retardation |
|---|---|---|---|
| | PCA Fudge | Control Fudge | |
| 1 day | 1.2 | 1.8 | 33.3 |
| 3 days | 2.2 | 4.9 | 55.2 |
| 9 days | 5.0 | 7.6 | 34.2 |

Throughout the test the fudge containing the humectant remained very soft and retained a smooth surface while the other batch became hard and appeared progressively more granular at the exposed surface.

Example 12

The following composition was prepared, in which the parts are by weight:

| | Parts |
|---|---|
| Sodium lauryl sulfate | 2.0 |
| Propylene glycol | 12.0 |
| Stearyl alcohol | 23.0 |
| White petrolatum | 21.0 |
| Sodium salt of 2-pyrrolidone-5-carboxylic acid | 5.0 |
| Water | 37.0 |

The stearyl alcohol and the white petrolatum were melted together in a water bath and adjusted to a temperature of about 75° C. The other ingredients were dissolved in water, warmed to 75° C., and added with stirring to the alcohol-petrolatum mixture until the composition reached room temperature. The resulting composition was a satisfactory hydrophylic ointment base, suitable for application to the skin after the addition of the desired medicament.

Although specific embodiments of the invention have been described herein, it is not intended to limit the invention solely thereto, but to include all of the obvious variations and modifications within the spirit and scope of the appended claims.

What is claimed is:
1. A moisture-retaining aqueous cosmetic composition comprising a cosmetic formulation which tends to lose water upon exposure to the atmosphere having incorporated therein, as an essential humectant therefor, at least 2% by weight, based on the total weight of the composition, of at least one member of the class consisting of the sodium, potassium, ammonium, and lower alkanolamine salts of 2-pyrrolidone-5-carboxylic acid, 1-methyl-2-pyrrolidone-5-carboxylic acid, and 2-pyrrolidone-4-methyl-5-carboxylic acid.

2. A moisture-retaining cosmetic composition as claimed in claim 1 in which said salt is the sodium salt of 2-pyrrolidone-5-carboxylic acid.

3. A moisture-retaining cosmetic composition as claimed in claim 1 in which said salt is the sodium salt of 2-pyrrolidone-4-methyl-5-carboxylic acid.

4. A moisture-retaining cosmetic composition as claimed in claim 1 in which said salt is the sodium salt of 1-methyl-2-pyrrolidone-5-carboxylic acid.

References Cited by the Examiner
UNITED STATES PATENTS

| | | | |
|---|---|---|---|
| 2,295,600 | 9/1942 | Natelson et al. | 260—313 |
| 2,468,012 | 4/1949 | Isbell | 260—534 |
| 2,543,345 | 2/1951 | Waller et al. | 260—482 |
| 2,619,467 | 11/1952 | Isbell | 252—152 |
| 2,684,946 | 7/1954 | Schmitz | 252—106 |
| 2,757,125 | 7/1956 | Mudrak | 167—93 |

(Other references on following page)